73-664 SR

OR 3,232,098

A

Feb. 1, 1966 L. L. DAIGLE 3,232,098

AMPLITUDE LIMITER

Filed Feb. 26, 1962

INVENTOR.
LOUIS L. DAIGLE
BY
Shenier & O'Connor
ATTORNEYS

United States Patent Office 3,232,098

Patented Feb. 1, 1966

3,232,098
AMPLITUDE LIMITER

Louis L. Daigle, Manchester, Conn., assignor to United Aircraft Corporation, East Hartford, Conn., a corporation of Delaware Filed Feb. 26, 1962, Ser. No. 175,618
19 Claims. (Cl. 73—71.6)

My invention relates to an amplitude limiter and more particularly to a device for maintaining the amplitude of vibrations at a predetermined level.

In the prior art vibration amplitude control circuits have included thermistors, which change resistance value in accordance with root-mean-square current, or motor-driven potentiometers, or rectifier circuits in conjunction with low-pass filters having a very low cut-off frequency compared with the frequency of vibration to provide a substantially ripple-free direct-current signal. Such vibration amplitude limiters of the prior art not only produce severe distortion but also require appreciable time to respond to disturbances from a given vibration amplitude.

I have invented an amplitude limiter having an extremely short response time which is especially adapted, for example, to control vibration transients in an intermittent flow supersonic wind tunnel. My amplitude control circuit achieves rapid response with negligible distortion. Only signal components at the vibration frequency are present; and harmonic components which would tend to saturate and over-heat the power amplifier and the force coil motor are effectively rejected.

One object of my invention is to provide an amplitude limiter having an extremely rapid response adapted to apply corrective action within half a cycle after the initiation of a disturbance.

Another object of my invention is to provide an amplitude limiter having negligible distortion which provides a substantially pure sinusoidal output.

A further object of my invention is to provide a phase-sensitive amplitude limiter which applies a signal of reversible polarity to maintain vibrations at a predetermined level.

Other and further objects of my invention will appear from the following description:

In general my invention contemplates the provision of three modulators. One of the modulators is subjected to the alternating current vibration signal and to a full-wave rectified vibration signal. A second modulator is subjected to the alternating current vibration signal and to a variable direct current signal which is set in accordance with the desired amplitude of vibration. The first two modulators generate equal vibration frequency signals if the direct current component of rectified vibration signal is equal to the variable reference signal. However, the first modulator produces considerable distortion because it is subjected to the ripple which is inherent in the full-wave rectification of the vibration signal. Accordingly, I provide a third modulator which is subjected only to the rectified vibration signal. By properly combining the outputs of the three modulators I may provide a sinusoidal control signal having negligible distortion.

In a further aspect of the invention I may substantially eliminate the small residual distortion by providing a fourth modulator which is also subjected to the reference signal. By coupling only the alternating-current ripple component of the rectified vibration signal through a high-pass filter to the second and fourth modulators I may effectively cancel all residual distortion without disturbing the response time of the circuit.

In the accompanying drawings which form part of the instant specification and which are to be read in conjunction therewith:

Figures 1, 2, 3:
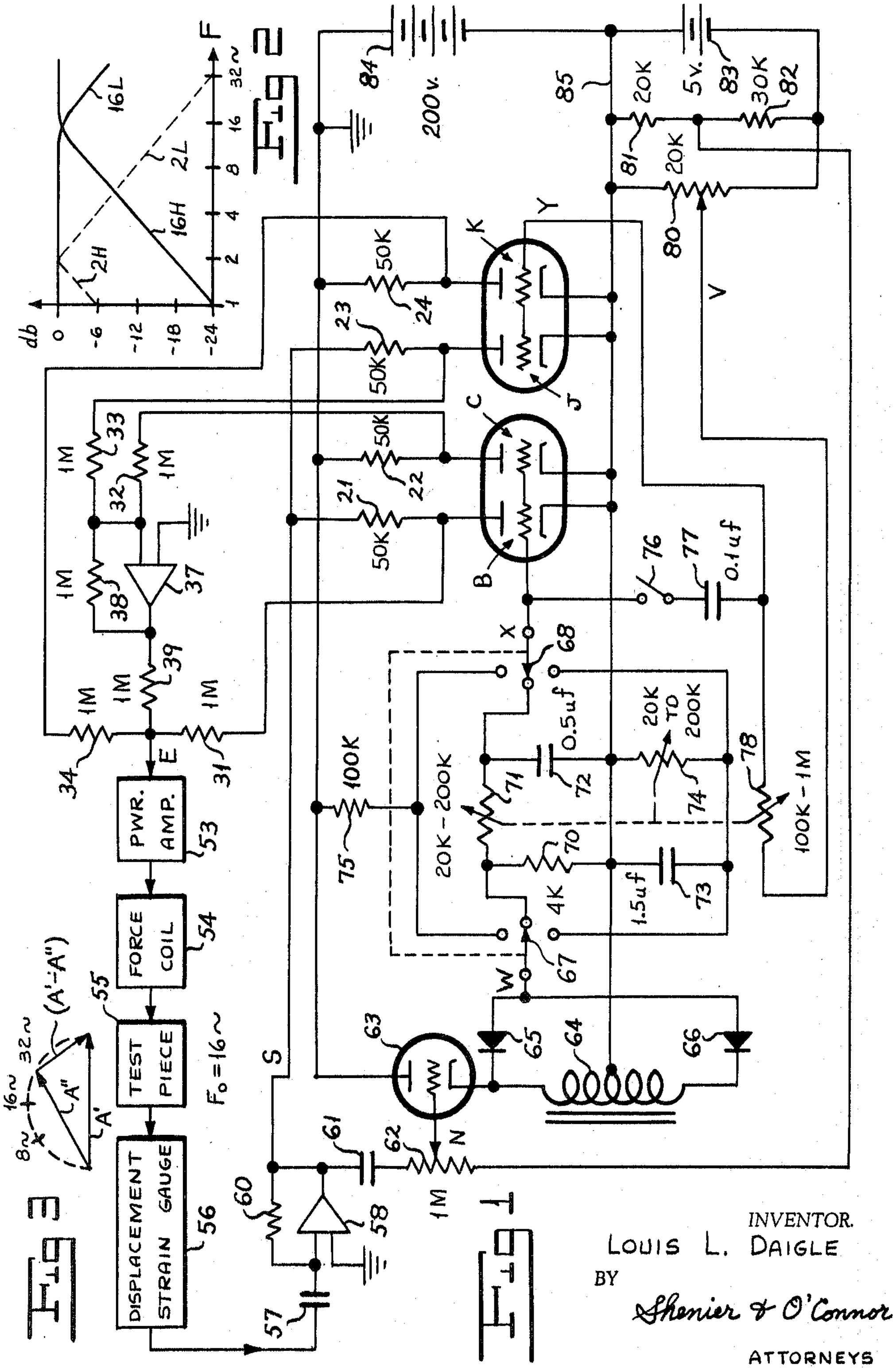
FIGURE 1 is a schematic view of my amplitude limiter in a closed vibration control loop.
FIGURE 2 is a graph of attenuation in decibels against frequency in cycles per second for the high-pass and low-pass filters for various cut-off frequencies.
FIGURE 3 is a circle diagram showing the cancellation of residual distortion by the high-pass filter circuit.

Referring more particularly now to FIGURE 1, the positive terminal of a plate supply battery 84 having a convenient potential of two-hundred volts is grounded and the negative terminal thereof is connected to a negative supply conductor 85. The cathodes of twin triodes indicated generally by the reference letters B and C are connected to conductor 85. Likewise, the cathodes of the twin triodes indicated generally by the reference letters J and K are connected to conductor 85. The plates of triodes C and K are connected through respective fifty kilohm resistors 22 and 24 to ground. The plates of triodes B and J are connected through respective fifty kilohm resistors 21 and 23 to the output of a high-gain, chopper-stabilized, direct-current, feedback amplifier 58. The output of amplifier 58 provides the vibration signal S. The plates of triodes C and J are connected through respective one megohm summing resistors 32 and 33 to the input of a high-gain, direct-current, chopper-stabilized amplifier 37 which is provided with a one megohm feedback resistor 38. The plates of triodes B and K and the output of amplifier 37 are coupled through respective one megohm summing resistors 31, 34, and 39 to a power amplifier 53. The output of the amplitude limiter constitutes the input to power amplifier 53 and is designated by the letter E. Power amplifier 53 drives force coil 54 which in turn controls the amplitude of vibration of test piece 55. I have indicated that the natural oscillating frequency $F_0$ is 16 cycles per second. Displacement strain gauge 56 associated with the test piece 55 generates a signal as a function of mechaical displacement. The output of strain gauge 56 is coupled through a capacitor 57 to the input of amplifier 58 which is provided with a feedback resistor 60. The combination comprising input capacitor 57, amplifier 58, and feedback resistor 60 forms a differentiating circuit so that the signal S is proportional to velocity. It will be noted that the force upon test piece 55 from coil 54 is also proportional to velocity. Thus the 90° phase shift afforded by the differentiating circuit comprising components 57, 58, and 60 results in a phase shift of either 0° or 180° around the closed loop. The output of differentiating amplifier 58 is coupled through a capacitor 61 to one terminal of a one megohm sensitivity control potentiometer 62. The slider of potentiometer 62, at which is provided the input signal N, is coupled to the grid of a cathode follower triode 63, the plate of which is grounded. The cathode of tube 63 is connected to one terminal of a center-tapped, audio-frequency inductor 64. The center-tap of inductor 64 is connected to conductor 85. The cathode of triode 63 and the other terminal of winding 64 are coupled backwardly through rectifiers 65 and 66 to the armature of a three-position switch 67 at which is provided the negative-going, full-wave, rectified signal W. The positive terminal of an auxiliary five volt battery 83 is connected to negative supply conductor 85. Battery 83 is shunted by a series circuit comprising a twenty kilohm resistor 81 and thirty kilohm resistor 82. The junction of resistors 81 and 82 is two volts negative relative to conductor 85. The other terminal of sensitivity control potentiometer 62 is connected to the junction of resistors 81 and 82. Thus cathode follower 63 is provided with a fixed negative bias. The center contact of switch 67 is shunted to conductor 85 through a four kilohm resistor 70. I provide an average value low-pass filter comprising a series resistor 71, which is variable between twenty and two hundred kilohms, and a 0.5 microfarad shunt capacitor 72. The filter output across capacitor 72 is connected to the center contact of a three-position switch 68. The lower contact of switch 67 is connected to a peak-value filter comprising a 1.5 microfarad shunt capacitor 73 and a shunt resistor 74 which is variable between twenty and two hundred kilohms. The output of the peak value filter is connected to the lower contact of switch 68. The upper contact of switch 67 is connected to the upper contact of switch 68 and is further coupled to ground through a one hundred kilohm resistor 75. The armatures of switches 67 and 68 are ganged for simultaneous movement. The full-wave rectified and filtered output at the armature of switch 68 is represented by X. The armature of switch 68 is connected to the grids of each of triodes B and C and is further connected through a switch 76 to one plate of a 0.1 microfarad capacitor 77. Auxiliary battery 83 is further shunted by a twenty kilohm amplitude control potentiometer 80. The slider of potentiometer 80 provides the variable reference voltage V and is connected to one terminal of a resistor 78, which is variable between one hundred kilohms and one megohm. The other terminal of resistor 78 and the other plate of capacitor 77 are connected to the grids of triodes J and K, the signal on such grids being represented by Y. Variable resistors 71, 74 and 78 are ganged so that for the minimum resistance adjustment they provide respective values of twenty, twenty, and one hundred kilohms. It is desirable that phase-splitting inductor 64 be well balanced and that rectifiers 65 and 66 be well matched so that the negative-going, full-wave rectified signal W at the armature of switch 67 contains no fundamental frequency component.

Let the sinusoidal input signal at the grid of cathode follower 63 be represented by $$N(U)=M\cos(F_0U) \quad (1)$$

Accordingly, for the first two terms in the Fourier expansion $$W(U)=\frac{2M}{\pi}+\frac{4M}{\pi}\left(\frac{1}{3}\cos\overline{2F_0U}-\frac{1}{15}\cos\overline{4F_0U}\right) \quad (2)$$

If the direct current component of W is D and the alternating current component is A, then $$W=D+A \quad (3)$$

$$D=\frac{2M}{\pi}=.636M \quad (4)$$

It will be seen from Equation 2 that A comprises substantially the second harmonic component since the fourth harmonic component is negligible being only one-fifth that of the second harmonic component. Thus, $$A=\frac{4M}{3\pi} \quad (5)$$

In the position of armatures 67 and 68 shown, the average value filter introduces attenuation of the alternating current component A while passing the direct current component D. If A′ is the amplitude of ripple output of the filter, then $$X=D+A' \quad (6)$$

It is desirable that the filter introduce appreciable discrimination against the second harmonic component. Accordingly, the cut-off frequency should not exceed $F_0=16$ cycles per second. As may be seen by reference to curve 16L of FIGURE 1, a low-pass filter having a cut-off frequency of $F_0=16$ cycles per second introduces an attenuation of six db at $2F_0=32$ cycles per second. The resistance and capacitance values of a low-pass filter having a cut-off frequency equal to $F_0$ are determined from the following equation:

$$(RC)_a=\frac{1}{2\pi F_0} \quad (7)$$

It will be noted that the minimum twenty kilohm value of resistor 71 in conjunction with capacitor 72 yields $(RC)_a=.01$ which satisfies Equation 7 for $F_0=16$. The six db attenuation afforded by the average value filter at $2F_0=32$ cycles per second represents a factor of two; and A′ will be one-half A. Hence, $$A'=\frac{2M}{2\pi} \quad (8)$$

It will be appreciated that the fourth harmonic component $4F_0=64$ cycles per second is subjected to an attenuation of 12 db, representing a factor of four; and the ratio of the fourth harmonic to second harmonic in the output of the filter will be one-tenth. The ripple factor P is $$P=\frac{A'}{D}=\frac{1}{3} \quad (9)$$

With switch 76 open, as shown, only the variable reference signal V is coupled to the grids of modulators J and K. Thus, $$Y=V \quad (10)$$

Modulators B, C, J, and K provide outputs not only in accordance with the individual signals applied to the grids and to the plates, but also in accordance with the products of such signals. The four modulators provide the following functional outputs:

$$B=S+D+A'+SD+SA' \quad (11)$$
$$C=D+A' \quad (12)$$
$$J=S+V+SV \quad (13)$$
$$K=V \quad (14)$$

Inverting amplifier 37 causes the outputs of modulators C and J to be summed with a negative polarity and added to the outputs of modulators B and K. Hence, $$E=B-C-J+K \quad (15)$$

Substituting Equations 11, 12, 13, and 14 in Equation 15, $$E=S(D-V)+SA' \quad (16)$$

The quantity $S(D-V)$ represents the desired phase-sensitive output. The quantity SA′ represents a residual intermodulation distortion term which has been found in practice not to be objectionable. The intermodulation term SA′ is of a frequency $3F_0=48$ cycles per second. It will be noted from Equation 16 that E contains no second harmonic component, since the A′ output of modulator C cancels the A′ output of modulator B. It is such second harmonic component $A'=2F_0$ which is most objectionable.

By actuating switches 67 and 68 so that the armatures engage the lower contacts, I may employ a peak value filter instead of an average value filter. A peak value filter creates a series of recurring transients. The output of the filter has a maximum value of M which exponentially sags as capacitor 73 is discharged through resistor 74. I have found that a peak value filter having an exponential sag of 50%, where the minimum output of the filter is half the maximum output, is equivalent to an average value filter having a cut-off frequency of $F_0$. The resistance and capacitance values of a peak value filter having a sag of 50% may be determined from the following equation:

$$(RC)_p=\frac{T_0}{2}=\frac{1}{2F_0} \quad (17)$$

The minimum twenty kilohm value of resistor 74 in conjunction with capacitor 73 yields $(RC)_p=.03$ which satisfies Equation 17 for $F_0=16$. In Equation 17, $T_0$ represents the period corresponding to one cycle at the fundamental frequency $F_0$. For a peak value filter, I have determined the design criterion that the time-constant should be not appreciably less than one-half the period. For a peak value filter having the minimum time-constant, the sag is 50%; and the following equations are approximately correct:

(18) $$D=.75M$$

(19) $$A'=.25M$$

(20) $$P=\frac{A'}{D}=\frac{1}{3}$$

It will be seen from Equations 9 and 20 that an average value filter having a 0.1 time-constant produces substantially the same ripple factor as a peak value filter having a .03 time-constant.

I have found that the speed of response is not increased by eliminating the filter but that the intermodulation distortion represented by the second term of Equation 16 is seriously increased and no longer negligible. However, as will be described subsequently in greater detail, the armatures of switches 67 and 68 may be connected to the upper contacts, and thereby eliminate any low-pass filtering, provided switch 76 is closed.

When switch 76 is closed,

(21) $$Y=V+A''$$

It will be noted that the quantity A'' represents that portion of the second harmonic ripple A' which passes through the high-pass filter, comprising capacitor 77 and resistor 78, to the grids of modulators J and K. With switch 76 closed, the following functional equations apply:

(22) $$B=S+D+A'+SD+SA'$$
(23) $$C=D+A'$$
(24) $$J=S+V+A''+SV+SA''$$
(25) $$K=V+A''$$
(26) $$E=S(D-V)+S(A'-A'')$$

Again the term $S(D-V)$ is the desired phase-sensitive output. In FIGURE 2 the curve 16H represents the attenuation versus frequency characteristic of the high-pass filter comprising capacitor 77 and resistor 78 for the minimum one hundred kilohm resistance value which gives a cut-off frequency of 16 cycles per second. FIGURE 3 is a circle diagram showing the relationship of A', A'', and the difference quantity $(A'-A'')$ at the second harmonic frequency $2F_0=32$ cycles. It will be noted that as frequency increases, A'' approaches A' so that $(A'-A'')$ approaches zero. In Equation 26 it will be seen that the intermodulation distortion term $S(A'-A'')$ is negligible.

I may completely eliminate any low-pass filtering by actuating switches 67 and 68 so that the armatures engage the upper contacts. This would normally create severe intermodulation distortion. However, by closing switch 76, I may reduce such distortion to substantially the same level as with switches 67, 68, and 76 in the positions shown. It will be appreciated that the absence of low-pass filtering will subject all four modulators (with switch 76 closed) to large grid swings. Since the characteristics of the four modulators may exhibit some slight mismatch due to normal manufacturing tolerances, cancellation of distortion may not always be precise. Accordingly, I have found it preferable to employ sufficient low-pass filtering so that the ripple factor P does not exceed one-third, and the modulators are not subjected to such extreme grid swings. It will be appreciated that I may use either low-pass filtering or high-pass cancellation or both in combination. The use of high-pass cancellation is especially advantageous where low-pass filtering is employed since the adverse effect of modulator mismatch is suppressed by the reduced grid swing.

In applications where extreme speed of response is not required, then the resistance values of resistors 71, 74, and 78 may be increased for further discrimination against intermodulation distortion. In FIGURE 2, curve 2L applies for low-pass filters where the resistance value of either of resistors 71 and 74 is one-hundred-sixty kilohms, and the cut-off frequency of the filter is two cycles per second; and curve 2H applies for an eight-hundred kilohm value of resistor 78 of the high-pass cancellation filter, where the cut-off frequency is also two cycles per second.

The modulator plate current should never drop to zero, since this would introduce appreciable harmonic content which would increase the intermodulation distortion. Accordingly the sensitivity and amplitude control potentiometers 62 and 80 should be adjusted so that the signal S is appreciably less than the plate supply voltage provided by battery 84. Furthermore, the maximum negative excursions of the signal X should not be so large that the triode modulators are driven to cut-off.

It will be seen that I have accomplished the objects of my invention. My amplitude limiter has an extremely fast response and is adapted to apply corrective action within half a cycle after the occurrence of a disturbance. The filters, whether of the low-pass type or of the high-pass cancellation type, may have a cut-off frequency as great as the oscillating frequency $F_0$. In my amplitude limiter, even though such minimal filtering be employed, yet there is complete elimination of the more serious second harmonic output of the full-wave rectifier, and even residual intermodulation distortion is reduced to negligible levels. My amplitude limiter provides a phase-sensitive output of a reversible polarity to maintain the amplitude of oscillation constant.

It will be understod that certain features and subcombinations are of utility and may be employed without reference to other features and subcombinations. This is contemplated by and is within the scope of my claims. It is further obvious that various changes may be made in details within the scope of my claims without departing from the spirit of my invention. It is therefore to be understood that my invention is not to be limited to the specific details shown and described.

Having thus described my invention, what I claim is:

1. An amplitude limiter including in combination an alternating-current signal source of a certain frequency and period, rectification means responsive to the signal source, a direct-current reference source, a first and a second and a third modulator providing the respective outputs B and C and J, a direct-current supply, means coupling the supply to each of the modulators, first means coupling the rectification means to the first and second modulators, means coupling the signal source to the first and third modulators, means coupling the reference source to the third modulator, and means responsive to the outputs of the three modulators for providing a voltage E defined by an aquation of the form $E=\pm(B-C-J)$.

2. An amplitude limiter as in claim 1 in which the first means coupling the rectification means to the first and second modulators includes a low-pass filter.

3. An amplitude limiter as in claim 1 in which the rectification means is full-wave and in which the first coupling means includes a low-pass filter having a ripple-factor not greater than one-third.

4. An amplitude limiter as in claim 1 in which the rectification means is full-wave and in which the first coupling means includes an average-value low-pass filter having a cut-off frequency not greater than the signal source frequency.

5. An amplitude limiter as in claim 1 in which the rectification means is full-wave and in which the rectification means is full-wave and in which the first coupling means includes a peak-value low-pass filter having a time-constant not less than half the signal source period.

6. An amplitude limiter including in combination an alternating-current signal source, rectification means responsive to the signal source, a direct-current reference source, a first and a second and a third and a fourth modulator providing the respective outputs B and C and J and K, a direct-current supply, means coupling the supply to each of the modulators, means coupling the rectification means to the first and second modulators, means coupling the signal source to the first and third modulators, means coupling the reference source to the third and fourth modulators, and means responsive to the outputs of the four modulators for providing a voltage E defined by an equation of the form $$E=\pm(B-C-J+K)$$

7. An amplitude limiter including in combination an alternating-current signal source of a certain frequency, rectification means responsive to the signal source, a direct-current reference source, a high-pass filter having an input and an output and a reference terminal, a first and a second and a third and a fourth modulator providing the respective outputs B and C and J and K, a direct current supply, means coupling the supply to each of the modulators, means responsive to the rectification means for providing a control signal, means coupling the control signal to the first and second modulators and to the input terminal, means coupling the signal source to the first and third modulators, means coupling the reference source to the reference terminal, means coupling the output terminal to the third and fourth modulators, and means responsive to the outputs of the four modulators for providing a voltage E defined by an equation of the form $E=\pm(B-C-J+K)$.

8. An amplitude limiter as in claim 7 in which the rectification means is full-wave and in which the high-pass filter has a cut-off frequency not greater than the signal source frequency.

9. An amplitude limiter as in claim 7 in which the control signal means includes a low-pass filter.

10. An amplitude limiter including in combination an alternating-current signal source of a certain frequency the period, rectification means responsive to the signal source and providing a rectified output, a first and a second modulator each providing an output, a direct-current supply, means coupling the supply to each of the modulators, first means coupling the rectified output to the first modulator, second means coupling the rectified output to the second modulator, means coupling the signal source to one of the modulators, and means for combining the outputs of the first and second modulators.

11. An amplitude limiter as in claim 10 in which one of the first and second coupling means includes a filter circuit.

12. An amplitude limiter as in claim 10 in which the first and second coupling means both include a common low-pass filter.

13. An amplitude limiter as in claim 10 in which the first coupling means includes a high-pass filter.

14. An amplitude limiter as in claim 10 in which the first coupling means includes a low-pass filter in series with a high-pass filter.

15. An amplitude limiter as in claim 10 in which the first coupling means includes a high-pass filter having a reference terminal, the limiter further including a direct-current reference source and means coupling the reference source to the reference teminal.

16. An amplitude limiter as in claim 10 in which the rectification means is full-wave and in which the first coupling means includes a filter circuit having a cut-off frequency not greater than the signal source frequency.

17. An amplitude limiter as in claim 10 in which the rectification means is full-wave and in which the first coupling means includes a low-pass filter having a ripple factor not greater than one-third.

18. An amplitude limiter as in claim 10 in which the rectification means is full-wave and in which the first coupling means includes a peak-value low-pass filter having a time-constant not less than half the signal source period.

19. A vibration control circuit including in combination a member having a natural frequency of vibration, means for applying electromagnetic forces to the member, means comprising a strain gauge for providing a signal in accord with displacement of the member, means comprising a differentiating circuit for shifting the signal through a phase lead of 90°, a full-wave rectifier responsive to the differentiating circuit, a low-pass filter responsive to the rectifier and providing an output having a ripple factor not greater than one-third, a high-pass filter provided with an input and an output and a reference terminal and having a cut-off frequency not greater than the natural vibration frequency, a first and a second and a third and a fourth modulator providing the respective outputs B and C and J and K, a direct-current supply, means couplying the supply to each of the modulators, means coupling the output of the low-pass filter to the first and second modulators and to the input terminal of the high-pass filter, means coupling the differentiating circuit to the first and third modulators, a direct-current reference source, means coupling the reference source to the reference terminal of the high-pass filter, means coupling the output terminal of the high-pass filter to the third and fourth modulators, means responsive to the outputs of the four modulators for providing a voltage E defined by an equation of the form $E=\pm(B-C-J+K)$, and means responsive to said voltage for controlling the electromagnetic means.

References Cited by the Examiner

UNITED STATES PATENTS

| | | | |
|---|---|---|---|
| 2,286,442 | 6/1942 | Schock | 328—173 |
| 2,373,351 | 4/1945 | Sims | 73—67.4 |
| 2,788,659 | 4/1957 | Radnar et al. | 73—67.4 |
| 3,015,229 | 1/1962 | Maki | 73—71.6 |
| 3,045,476 | 7/1962 | Bell | 73—71.6 |
| 3,068,418 | 12/1962 | Hajian. | |

FOREIGN PATENTS

| | | |
|---|---|---|
| 627,543 | 8/1949 | Great Britain. |

RICHARD C. QUEISSER, *Primary Examiner.*

JOHN P. BEAUCHAMP, *Examiner.*